United States Patent [19]

Overs

[11] E Re. 28,839

[45] Reissued June 8, 1976

[54] MARINE SPEEDOMETER

[76] Inventor: Ronald R. Overs, 96 Fox Hunt Lane, East Amherst, N.Y. 14051

[22] Filed: Feb. 11, 1974

[21] Appl. No.: 441,270

Related U.S. Patent Documents

Reissue of:

[64] Patent No.: 3,706,224
Issued: Nov. 14, 1972
Appl. No.: 112,268
Filed: Feb. 3, 1971

[52] U.S. Cl. ..... 73/187
[51] Int. Cl.[2] ..... G01C 21/10
[58] Field of Search ..... 73/187, 229, 231 R; 115/49, 50, 52, 53, 54

[56] References Cited

UNITED STATES PATENTS

| | | | |
|---|---|---|---|
| 128,324 | 6/1872 | Pierce | 73/187 |
| 3,433,065 | 3/1969 | Mergler | 73/187 |
| 3,457,782 | 7/1969 | Maeder | 73/187 |
| 3,496,770 | 2/1970 | Fasset | 73/187 |

*Primary Examiner*—S. Clement Swisher
*Assistant Examiner*—Denis E. Corr
*Attorney, Agent, or Firm*—Allen J. Jaffe

[57] ABSTRACT

A low drag impeller wheel mounted in an enclosure which when installed in the hull of a ship will rotate through the force of water acting upon it, and operate magnetically a pulse generating mechanism that through a current responsive instrument will indicate the speed of the vessel.

9 Claims, 5 Drawing Figures

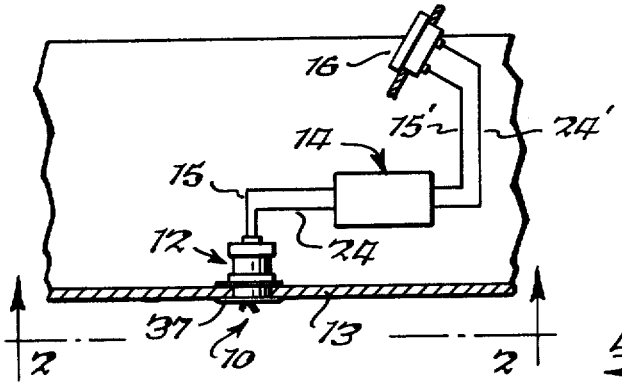
Fig. 1.
Fig. 3.
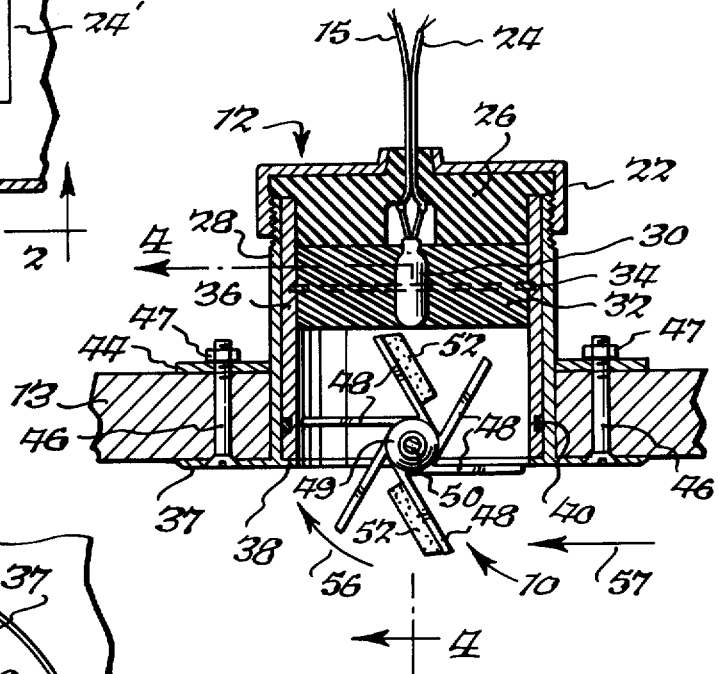
Fig. 2.
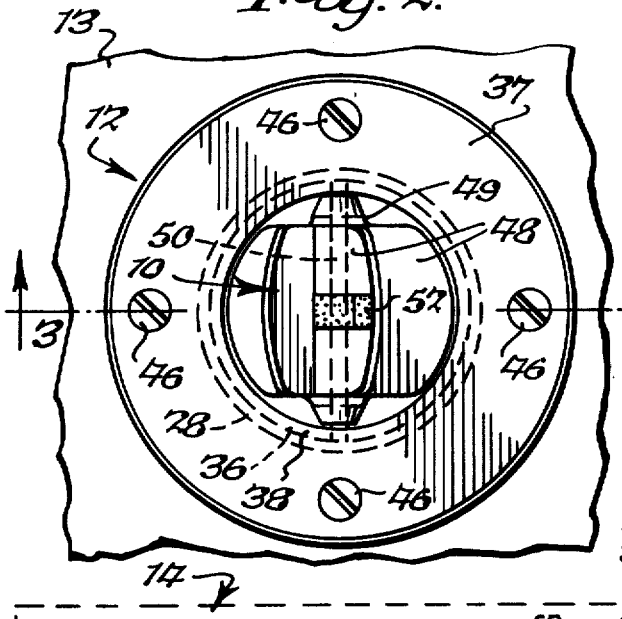
Fig. 4.
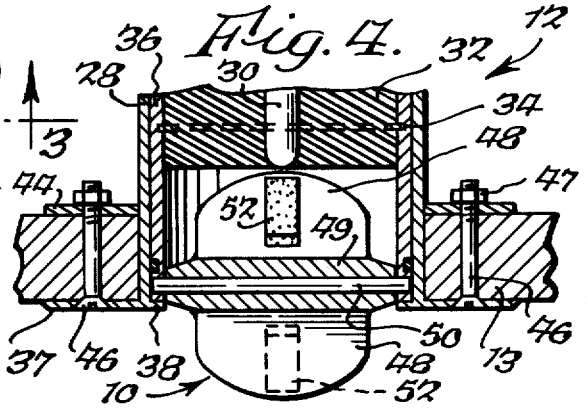
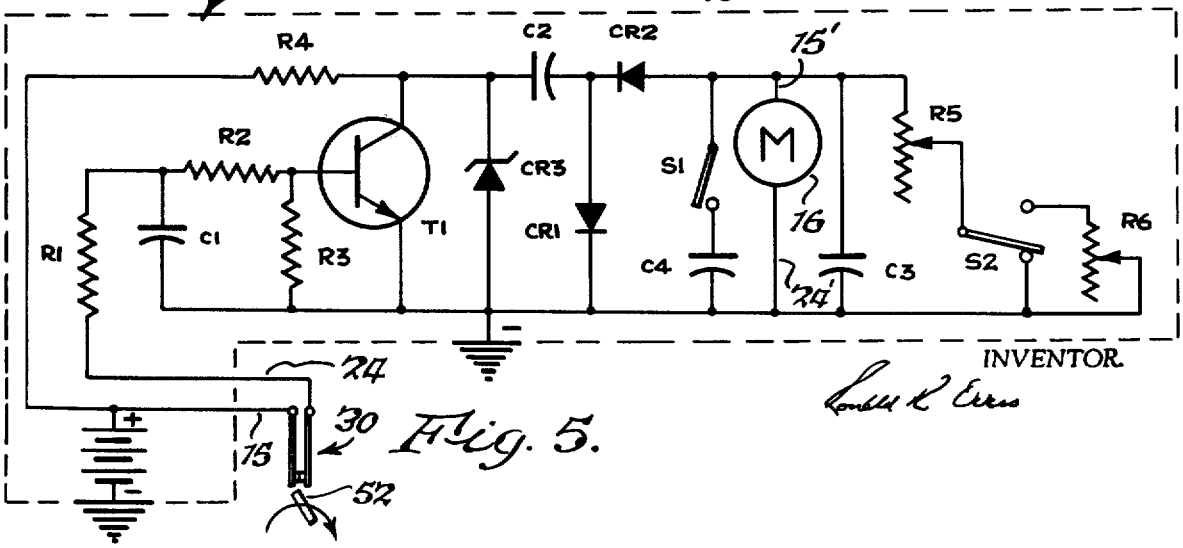
Fig. 5.
INVENTOR.

MARINE SPEEDOMETER

Matter enclosed in heavy brackets [ ] appears in the original patent but forms no part of this reissue specification; matter printed in italics indicates the additions made by reissue.

SUMMARY OF THE INVENTION

This invention is concerned with providing a low cost device that will, with a minimum impediment to the velocity of a hull through water, indicate on a current responsive instrument, the speed through the water of the hull.

In implementing the invention, an impeller with its blades affixed on a tangent to its hub, is partially exposed to the flow of water beneath the hull, this causes it, due to the pressure on the vanes, to rotate in direct proportion to the speed of the hull. As the impeller rotates it opens a normally closed magnetically sensitive device by means of a magnet, or magnets, mounted axially on the vane, or vanes, coming in proximity to the magnetically responsive device.

The interruption of a current flow through the normally closed device produces a switching action through a transistor circuit that allows a capacitor that was charging, to discharge, through a current responsive device with increased incident, thereby, with the aid of a shunting variable resistor and a capacitor, used as a current averaging device, will calibrate the speed of the hull being particularly sensitive to small changes in velocity at the lower speed ranges.

The invention will be better understood by the following description in conjunction with the accompanying drawing:

FIG. 1 illustrates the invention positioned in the hull of a boat, having a visual speed indicator mounted on a bulkhead.

FIG. 2 is a bottom plan of the impeller taken along line 2—2 of FIG. 1.

FIG. 3 is a vertical sectional view of the impeller housing and its manner of mounting taken along line 3—3, FIG. 2.

FIG. 4 is another similar vertical sectional view taken along line 4—4, FIG. 3, with parts broken away.

FIG. 5 is an electrical diagram of the circuitry typical of this device.

Referring first to FIG. 1, the impeller assembly 10 is installed in housing 12, mounted in a hull 13, connecting with circuitry and power supply 14, through wires 15 and 24, which are in turn connected by wires 15' and 24' to a meter or other current responsive device 16.

In FIG. 2 we see the position of the impeller 10, installed in the housing with outer flange 37 apparent.

FIG. 3 shows a waterproof cap 22, through which wires 24 and 15, egress, fitted over a plug of rubber or other compressible material *or member* 26, screwed or otherwise securely fastened to outer flange 28. Magnetically operated, normally closed device 30 is imbedded in epoxy or other waterproof material *or member* 32, with a split ring or other similar device 34, to position and secure this assembly to inner-housing 36, which is inserted in outer-housing 28, coming to rest on an axial flange 38, with an O ring or similar seal 40, used to exclude water, using an inner housing allows the unit to be replaced if damaged or fouled without removing boat from the water. This assembly is secured to the hull 13, by means of an inner flange 44, and bolts 46, and nuts 47.

FIG. 4 shows the impeller unit comprising of hub 49 on which are affixed vanes 48, mounted on a shaft 50, with magnets 52, affixed or moulded in position relative to the magnetically operated, normally closed device 30.

The operation of the device can now be readily understood considering that the water flow pressure, FIG. 3, number 57, is exerted against the cupped portion of the vane, allowing it to rotate, as illustrated in the diagram 56, in a clockwise direction, until the magnet 52, exerts sufficient force to open magnetically operated device 30.

FIG. 5 shows a circuit suitable for use with the above device. Current flowing through a resistor of 22k ohms R and 220 ohms R2, and 1500 ohms R3, is applied to the base of a npn transistor R1, using 1 mfd capacitor C1 to filter any voltage oscillations that occur when the points open. 1 mfd capacitor C2 is connected to collector of transistor T1 and charges through silicon rectifier CR1 and 550 ohm resistor R4 when transistor T1 is off and discharges through 10K ohm variable resistor R5, and silicon rectifier CR2 and the meter M, or other current sensitive device when transistor T1 is on. C3 is a 500 mfd capacitor that allows averaging of the 1 mfd capacitor C2, so that a more stable reading will occur. C4 is a 1,000 mfd capacitor which can be activated by switch S1 in order to provide additional damping on the expanded scale or in rough or turbulent water. Switch S2 allows the introduction of a variable 2K ohm resistor, R6, in series with the 10K variable resistor R5, in order to allow an expanded reading at low speeds. A zenner diode CR3, is installed as a voltage regulating device. Variable resistors R5 and, or, R6, can be used to calibrate the meter or other current sensing device to implement an accurate reading regardless of the hull type or positioning of the impeller assembly. The nature of the circuit is of very low current consumption thereby allowing the use of portable battery sources and effecting an extremely long life to the magnetically operated switch. It has been found that the impeller with its tangent mounted blades will rotate at 150 rpm for each mile per hour. However, other combinations of tangent blades in binary combinations or multiples thereof will not effect the spirit of this invention, neither will more or less magnets affixed to the above mentioned vanes.

The circuitry used will also suggest to those skilled in the art, various modifications. While the invention has been described as embodied in specific form and as operating in a specific manner, it should be understood that this invention is not limited thereto since various modifications will suggest themselves to those skilled in the art without departing from the spirit of the invention.

I claim:

1. A marine speed indicator comprising an impeller having an axis of rotation and blades which rotate about an axis, a magnet on at least one of said blades, and a magnetically operated switch in proximity to said impeller, a solid state circuit being actuated by said magnetically operated switch which actuation is caused by the rotation of said magnet in proximity to said switch, said solid state circuit including at least one transistor with base, emitter and collector; a power source; a capacitor; a zener diode, rectifier means, and ı meter, said base being coupled to said magnetically operated switch; said zener diode being connected between said collector and said emitter with said zener diode being in series with said power source; said capacitor having a terminal in common with said zener diode and another terminal in common with said rectifier means; and said meter being in series with the rectifying means.

*2. A marine speed indicator, comprising;*

*a substantially cylindrical tubular housing, one end of which is open and the other end of which is closed by a member having a substantially planar surface facing said open end with a hollow gap therebetween, said housing having a longitudinal axis, an impeller supported by said housing intermediate said ends thereof and mounted for rotation about an axis that is substantially perpendicular to said longitudinal axis and spaced from the walls of said housing and said planar surface, said impeller comprising a plurality of vanes, at least one of which contains and supports a magnet for rotation therewith, and means responsive to movement of said magnet for generating a signal which is proportional to rotational movement of said impeller.*

*3. The indicator according to claim 2, wherein; said vanes are affixed to a cylindrical hub with at least the innermost portions of said vanes extending in a tangential direction from said cylindrical hub.*

*4. The indicator according to claim 3, wherein; said magnet is mounted on the exterior of said vane.*

*5. The indicator according to claim 4, wherein; said means comprises a reed switch.*

*6. The indicator according to claim 5, further comprising; electronic circuit means responsive to the opening and closing of said reed switch for generating a signal proportional thereto.*

*7. The indicator according to claim 2, wherein said magnet is mounted on the exterior of said vane.*

*8. The indicator according to claim 7, wherein said means comprises a reed switch.*

*9. The indicator according to claim 8, further comprising; electronic circuit means responsive to the opening and closing of said reed switch for generating a signal proportional thereto.*

* * * * *